Aug. 17, 1926.
D. C. DAVIS
1,596,003
HARDNESS TESTING MACHINE
Filed July 6, 1925    2 Sheets-Sheet 1
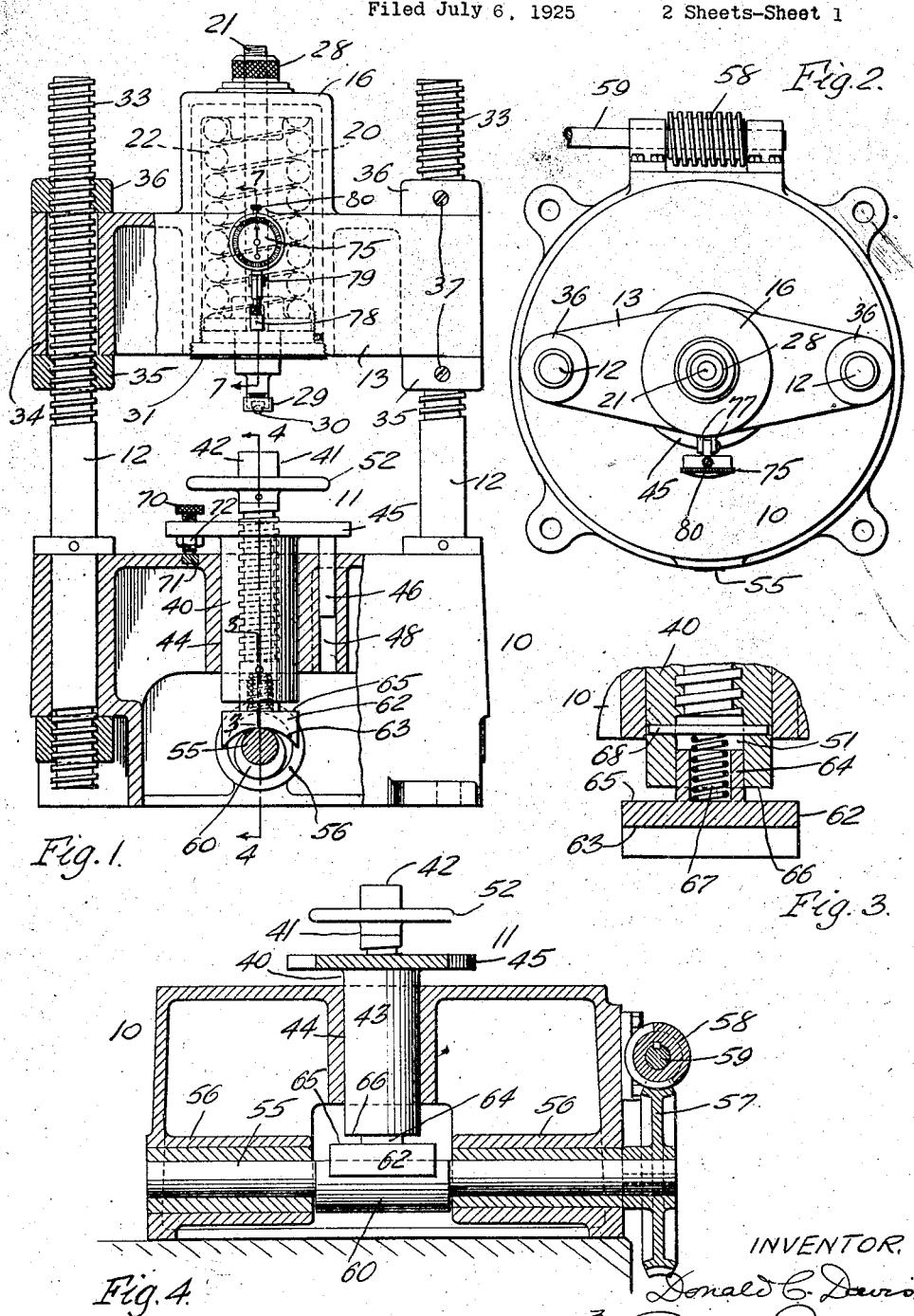
INVENTOR.
Donald C. Davis
By Parker & Brockmon.
ATTORNEYS

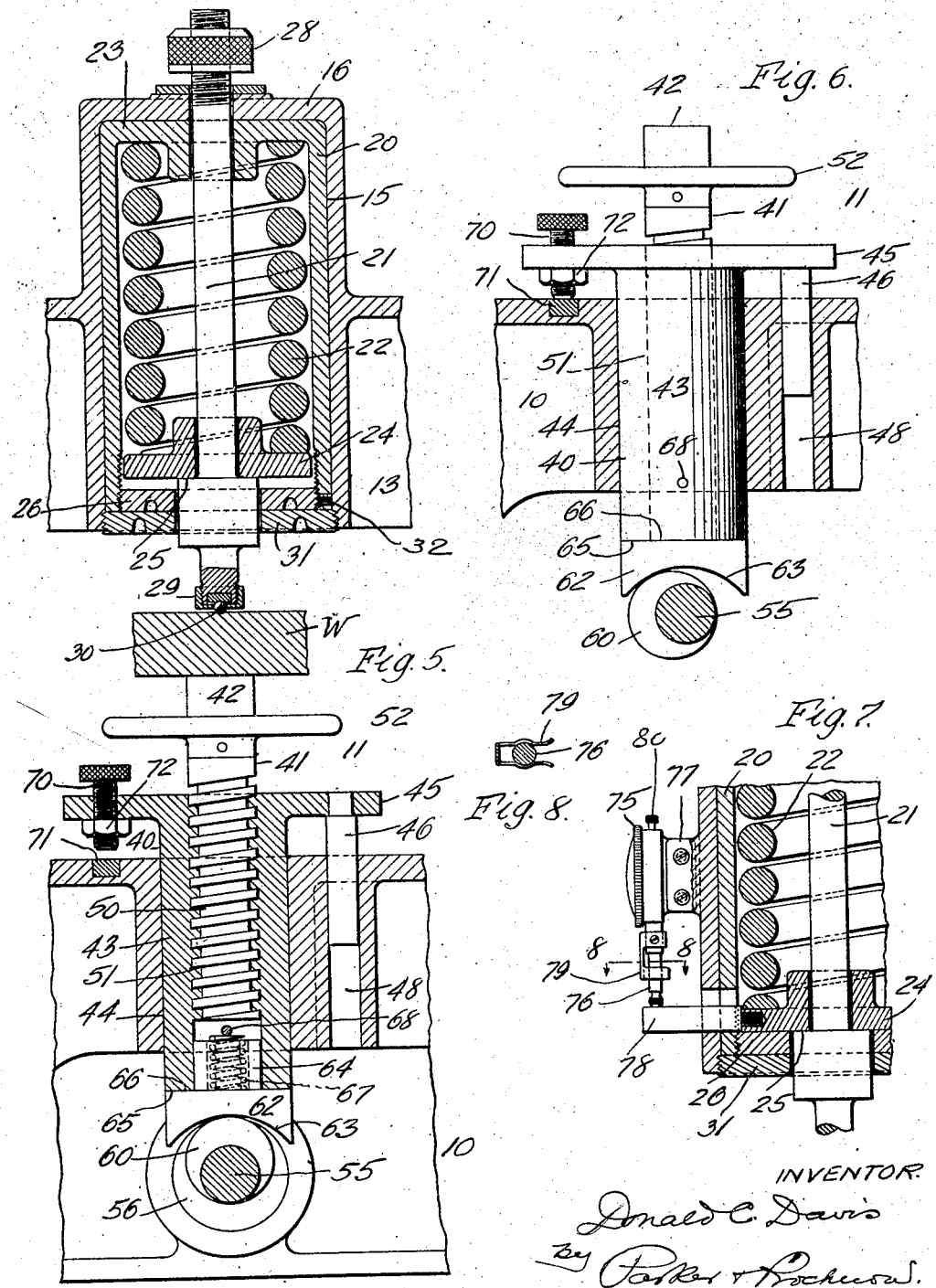

Patented Aug. 17, 1926.

1,596,003

UNITED STATES PATENT OFFICE.

DONALD C. DAVIS, OF WILLIAMSVILLE, NEW YORK.

HARDNESS-TESTING MACHINE.

Application filed July 6, 1925. Serial No. 41,664.

This invention relates to improvements in machines for testing the hardness of materials by the "Brinell" method, in which a hardened steel ball is pressed against the sample or piece of material to be tested, the hardness of which is determined from the measurement of the indentation made by the ball in the sample under a predetermined pressure.

The objects of the present invention are to provide a machine of the character stated which is designed and especially adapted to be operated by power so that tests may be made rapidly and expeditiously; also to construct a machine of this kind having an adjustable reciprocating work supporting element and a rotary element for causing the actuation of the same, and also to provide a lost motion connection between said elements so that the reciprocatory movement of said work supporting element will take place during a relatively short portion of the period of revolution of said rotary element so as to allow ample time for the insertion and removal of the samples or work pieces; also to provide improved, simplified and quickly actuated adjusting means for permitting the machine to be adapted to different thicknesses of samples; and also to provide novel take up and stop means adapted to permit the return of the reciprocating work supporting element to its initial lower position at the end of each test, said means being such as to prevent changes in the reciprocating or actuating means due to wear or otherwise.

Other objects are to provide machines of this character with an improved measuring element and measurement indicating means, and also to improve such machines in the other respects hereinafter specified and claimed.

In the drawings:—

Fig. 1 is a front elevation, partly in section, of a hardness testing machine embodying my invention.

Fig. 2 is a plan view thereof.

Fig. 3 is a fragmentary, vertical section, on an enlarged scale, on line 3—3, Fig. 1, of the lost motion connection between the reciprocatory work support and the rotary actuating element therefor.

Fig. 4 is a transverse, sectional elevation of the machine on line 4—4 Fig. 1.

Fig. 5 is an enlarged, fragmentary sectional elevation thereof, showing the parts in position occupied when a work piece is being subjected to pressure.

Fig. 6 is a fragmentary, sectional elevation of a portion of the machine, showing an intermediate position of some of the parts.

Fig. 7 is a fragmentary, vertical section, on an enlarged scale, of the measuring element and the measure indicating means, on line 7—7, Fig. 1.

Fig. 8 is a horizontal section, on line 8—8, Fig. 7, of the measurement indicating means.

Briefly stated, the machine comprises a stationary frame, a vertically reciprocable work support or platen arranged thereon, a drive shaft journalled in the frame, and means actuated by said shaft and adapted to reciprocate the work support or platen. Screw rods or members extend upwardly from the frame and adjustably support a measuring element embodying a plunger which carries the testing ball or member. a spring which yieldingly opposes upward movements of the plunger, which movements are effected by the engagement of pieces of material to be tested with the platen with the testing ball when the platen is moved upwardly, and measurement indicating means for showing the results of the tests.

In the particular embodiment of the invention shown in the drawings, the machine includes a base frame 10, in which the platen or work support 11 and its reciprocating mechanism are mounted, and a pair of vertically extending, spaced screw shafts or rods 12, projecting upwardly from the frame and which are adapted to rigidly but adjustably support a yoke 13 which carries the various parts of the measuring mechanism in operative position above the platen 11. The yoke 13 is formed with a central hollow portion or cylindrical chamber 15 closed at its upper end by a wall 16. The measuring unit is releasably secured in this chamber. The measuring unit comprises a cylindrical shell 20, a plunger 21 arranged within the shell to move axially thereof, and a strong spring 22 of known or predetermined capacity within the shell, one end of which engages the end wall 23 thereof, and the other end of which is engaged by a follower disk 24 through which the plunger extends, and which bears on an annular shoulder 25 of said plunger, so that upward movements of the plunger act through the follower 24 to compress the spring 22. The spring 22 and follower 24 are retained in the shell 20 by means of a threaded disk 26 which is screwed into the threaded open end of the shell and has a central aperture through which the plunger 21 extends. The upper end of the plunger passes through the upper end 23 of the casing and through an aperture in the top wall 16 of the chamber 15, and is threaded for the reception of a retaining nut 28 which is adapted to engage the wall 16, or an interposed washer, to limit the downward movement of the plunger and prevent it from dropping out of place. The lower end of the plunger is formed or provided with means of suitable construction, such as the screw cap 29, for releasably retaining the testing ball or member 30 in place with a portion thereof projecting downwardly towards the platen 11.

The measuring mechanism described is entirely self contained, and forms a unit which can be readily inserted in or removed from the chamber 15, and when positioned therein, may be held in place by a threaded disk 31 which is adapted to be screwed into the lower end of the chamber and bears against the shell 20. By this construction, the pressure exerted by the spring, when the device is not in operation, is transmitted to the disk 26 through the follower 24 and to the end wall of the shell 20 respectively, so that the plunger has no load to support, and a relatively small nut 28 can be used.

An important feature of the measuring element as described is that a plurality of the shells 20 may be provided, each having a spring 22 of different capacity therein, for instance, a spring of 3000 kilograms capacity or resistance for testing hard metals or materials, and a spring of 500 kilograms capacity for testing softer metals or materials. The springs are inserted in the shells at the factory and are adjusted exactly to their intended capacity by turning up the threaded disk 26 to the required degree, and then securing this disk permanently in such position as by a set screw 32 extending through the wall of the shell and engaging the disk, see Fig. 5. The measuring or resistance unit is therefore complete and its capacity predetermined and known, and one such unit may be quickly substituted for another without danger of changing or requiring the adjustment of the springs, by first removing the plunger 21 and the lower disk 31. After the springs have been once adjusted at the factory no further adjustment is necessary.

A further advantage of the construction shown is that a relatively long spring may be used, thus reducing the possible degree of error in the indication of the measurements due to the penetration of the test ball in the material, the travel of the platen 11 being always the same, as about to be explained.

The yoke 13 may be adjustably supported on, or attached to, the screw rods 12 in any suitable manner. In the construction shown, the threaded portions 33 of the rods pass freely through vertical cylindrical holes 34 in the opposite ends of the yoke, and a pair of nuts 35, each having threaded engagement with one of the rods 12, bears against the bottom face of the yoke, while a second pair of nuts 36, threaded on the rods, bear against the top face of the yoke, and in cooperation with the nuts 35 hold the yoke rigidly at any desired elevation on the rods 12. The nuts are prevented from turning, after being adjusted, by suitable locking means such as set screws 37 passing through the nuts and bearing against the rods 12. By loosening the set screws 37 and making the appropriate adjustment of the nuts 35 and 36, the yoke may be raised or lowered to position the measuring mechanism at any required distance above the platen 11 suitable for testing samples varying considerably in thickness. By again tightening the screws 37, the yoke will be held rigidly in its adjusted position.

The work support 11 is preferably constructed and mounted in the base frame 10 in the following manner. The work support comprises a reciprocatory platen carrier 40, and a platen member 41 movable therewith, and which is adapted to be adjusted axially thereof, and is provided with a platen or anvil 42 for supporting the work W. The carrier 40 is formed with a vertical, cylindrical body portion 43, slidably fitting in a bore 44 in the upper portion of the base 10, and a horizontal head 45 having a pin or rod 46 depending therefrom and slidably fitting in a guide hole 48 in the base to prevent the carrier 40 from turning during its reciprocatory movements in the bore 44. The platen member 41 is screw threaded and adapted to turn in a threaded hole 51 in the carrier 40 so that by turning the member 41, as by the hand wheel or disk 52, said member may be adjusted lengthwise so that it can be raised or lowered relatively to the carrier 40 for the purpose of correctly positioning the upper face of the work piece to be tested relatively to the ball 30.

The means shown for causing the intermittent reciprocation of the platen 42 includes a horizontal shaft 55 journalled in bearings 56 in the base 10, and having a worm wheel 57 secured to one end thereof, and meshing with a worm 58 for rotating the shaft. The worm 58 is secured on a shaft 59 adapted to be driven by any suitable source of power, such as an electric motor (not shown). The shaft 55 is provided between its ends with a fixed cam or eccentric 60, which during each revolution of the shaft is adapted to lift the platen 11 so as to engage the work piece to be tested with the ball 30, force the plunger 21 upwardly and compress the spring 22, the resistance of which will cause the ball 30 to indent the work piece.

In accordance with the present invention a lost motion device is disposed between the eccentric 60 and the lower end of the platen carrier so that noise will be prevented and the parts maintained in contact should wear between the parts occur. The lost motion device is so constructed that a considerable portion of the lifting action of the rotating cam is expended in taking up the lost motion, the remaining portion only of the upward movement lifting the platen. Thus the platen is held stationary for a considerable portion of each period of each revolution of the shaft, which allows ample time for the insertion, proper positioning, and subsequent removal of the work pieces. The lost motion device shown comprises a saddle or block 62 having an arcuate face 63 adapted to rest on the eccentric 60, and an upwardly extending hollow stem 64 slidably engaging in the smooth lower end of the hole 51 in the platen carrier 40. The upper face 65 of the block 62 is flat and is normally held yieldingly a distance below the flat bottom face 66 of the carrier 40 as by a coil spring 67 seated in the hollow stem 64, and bearing at its upper end against a cross pin 68 secured in the carrier 40, whereby the spring also yieldingly presses the block against the cam 60.

Assuming the parts to be in the position shown in Fig. 1, then upon the rotation of shaft 55, the cam 60 will lift the block 62 against the action of the spring 67 and will first engage the upper face 65 of said block with the face 66 of the platen carrier, see Fig. 6, and the continued rotation of the cam will then cause the elevation of the platen until the high point of the cam is reached, see Fig. 5. The distance that the platen moves upwardly is the difference between the distance between the faces 65 and 66 in Fig. 1 and the total throw of the cam 60.

The provision of the spring 67 permits proper contact between the cam 60 and block 62 at all times and thus prevents noise between these parts after wear occurs. However, to prevent the wear and consequent variations in the distance between the faces 65 and 66 from affecting or changing the definite predetermined upward movement of the platen and the extreme upward position of the top face of the anvil or platen 42, adjustable takeup means are provided for the purpose of maintaining the proper distance between the faces 65 and 66, and which means also act to limit the downward or return movement of the platen. These means in the construction shown comprise a stop screw 70 extending downwardly through and having threaded engagement with a hole in the head of the platen carrier so as to contact with a fixed part of the base 10, such for instance as the hardened block 71. In practice the screw 70 is adjusted when the machine is first assembled, so that its lower end contacts with the block 71 just as the faces 65 and 66 are brought into contact by the movement of the cam 60, and the screw is then secured in this position by a lock nut 72, whereby the platen is ensured a predetermined, constant upward and downward movement. As variations due to wear occur between the cam 60 and block 62, the stop screw 70 is adjusted, as may be necessary, to restore the original relation between the faces 65 and 66, whereby the lift of the eccentric is properly transmitted to the platen.

By the construction described, the member 41 can be adjusted vertically relatively to the test ball 30 by means of the wheel or disk 52 to suit the requirements of the particular sample or samples to be tested, and the user will be assured that the exact movement of the platen will occur at each reciprocation. The use of the cam for actuating the platen and the yielding lost motion device between these parts provides a relatively simple, strong and practical construction adapted to give continuous and dependable results.

Means of any suitable sort may be used to indicate the measurements of the indentations made by the ball in the samples to be tested, but preferably a device of the character shown in Figs. 1, 2, 7 and 8 is employed and which comprises a standard dial gage 75 for indicating the movement or compression of the spring 22, by means of a movable spring projected plunger rod 76. The gage 75 is provided with a lug adapted to be inserted between and be rigidly secured to a pair of lugs or parts 77 on the outer wall of chamber 15, with the plunger 76 engaging a pin or stud 78 which is rigidly secured to the follower 24 and projects out through registering holes in the shell 20 and the wall of the chamber 15, so that upward movements of said follower, and consequently the compression of the spring 22, are directly indicated. Means are provided in the machine shown for releasably holding the plunger rod 76 in the position to which it is moved by the pin 78, so that the measurement indicator of the gage may be retained in its measurement indicating position as long as desired. For this purpose a clip 79, see Figs. 7 and 8, is provided which is secured to a stationary part of the gage and has a pair of spring fingers which embrace the rod 76, and while permitting the same to move upwardly under pressure, will frictionally retain the rod in its raised position until the rod is released and returned by hand to its initial position. The pointer on the dial may be returned to zero, and the rod 76 lowered by pressing down on the finger piece 80 on the upper end of the plunger rod. The clip 79 is preferably removably secured to the gage so that it may be dispensed with when not desired.

I claim as my invention:—

1. In a hardness testing machine the combination of a frame, a measuring element having a spring pressed test member supported opposite said frame, a platen movable in and extending from said frame and adapted to be reciprocated toward and from said measuring element to press a sample against said test member, means for reciprocating said platen, and said platen comprising two members one of which is movable lengthwise relatively to the other for adjusting the platen to accommodate samples of different thicknesses.

2. In a hardness testing machine the combination of a frame, a measuring element having a spring pressed test member supported opposite said frame, a platen movable in and extending from said frame and adapted to be reciprocated toward and from said measuring element to press a sample against said test member, and a driven rotary member for causing the reciprocation of said platen.

3. In a hardness testing machine the combination of a frame, a measuring element having a spring pressed test member supported opposite said frame, a platen movable in and extending from said frame and adapted to be reciprocated toward and from said measuring element to press a sample against said test member, a rotatable shaft and an eccentric on said shaft adapted to move said platen towards said measuring element during each rotation of said shaft.

4. In a hardness testing machine the combination of a frame, a measuring element having a spring pressed test member supported opposite said frame, a platen movable in and extending from said frame and adapted to be reciprocated toward and from said measuring element to press a sample against said test member, an eccentric, means for rotating said eccentric, and a device disposed between said platen and said eccentric and adapted to be engaged by said eccentric to move said platen during a portion of each revolution of said eccentric.

5. In a hardness testing machine the combination of a frame, a measuring element having a spring pressed test member supported opposite said frame, a platen movable in and extending from said frame and adapted to be reciprocated toward and from said measuring element to press a sample against said test member, an eccentric, means for rotating said eccentric, and a device connected to said platen and yieldingly engaging said eccentric and adapted to be actuated thereby to cause the reciprocation of said platen.

6. In a hardness testing machine the combination of a frame, a measuring element having a spring pressed test member supported opposite said frame, a platen movable in and extending from said frame and adapted to be reciprocated toward and from said measuring element to press a sample against said test member, an eccentric, means for rotating said eccentric, and a lost motion device disposed between said platen and said eccentric and having a face spaced from a cooperating face on said platen, said device being adapted to be actuated by said eccentric to engage said faces during a portion of the lifting period of said rotatable eccentric and to lift said platen during the remaining portion of said lifting period.

7. In a hardness testing machine the combination of a frame, a measuring element having a spring pressed test member supported opposite said frame, a platen movable in and extending from said frame and adapted to be reciprocated toward and from said measuring element to press a sample against said test member, an eccentric, means for rotating said eccentric, and a lost motion device for transmitting motion from said eccentric to said platen to lift the same, yielding means disposed between said platen and said lost motion device for yieldingly pressing said device against said eccentric, and take up means for compensating for wear between said eccentric and said lost motion device.

8. In a hardness testing machine the combination of a frame, a measuring element having a spring pressed test member supported opposite said frame, a platen movable in and extending from said frame and adapted to be reciprocated toward and from said measuring element to press a sample against said test member, an eccentric, means for rotating said eccentric, and a device disposed between said platen and said eccentric and adapted to be engaged by said eccentric to move said platen, said device having a face adapted to be spaced a distance from a face on said platen when in engagement with the low point on said eccentric, and said faces being adapted to be engaged before the high point of said eccentric engages said device, and the subsequent rotation of said eccentric to the high point causing the platen to be lifted.

9. In a hardness testing machine the combination of a frame, a measuring element having a spring pressed test member supported opposite said frame, a platen movable in and extending from said frame and adapted to be reciprocated toward and from said measuring element to press a sample against said test member, an eccentric, means for rotating said eccentric, and a lost motion device disposed between said platen and said eccentric and adapted to be actuated by said eccentric to move said platen towards said measuring element during a portion of each revolution of said eccentric, and a take-up device for permitting a definite lift of said platen by said eccentric regardless of wear between said lost motion device and said eccentric.

10. In a hardness testing machine the combination of a frame, a measuring element having a spring pressed test member supported opposite said frame, a platen movable in and extending from said frame and adapted to be reciprocated toward and from said measuring element to press a sample against said test member, an eccentric, means for rotating said eccentric, and a lost motion device disposed between said platen and said eccentric and adapted to be actuated by said eccentric to move said platen towards said measuring element during a portion of each revolution of said eccentric, and an adjustable stop on said platen adapted to engage a fixed part on said base frame and adapted to be adjusted so as to insure a definite lift of said platen regardless of wear between said lost motion device and said eccentric.

11. In a hardness testing machine, the combination of a frame, a measuring element having a spring pressed test member supported above said frame, a platen movable in and extending from said frame and adapted to be moved toward and from said measuring element to press a sample against said test member, said measuring element having a yielding member adapted to be compressed by the pressure exerted on said test member by said sample, a measurement indicator, a plunger therein adapted to be moved by the compression of said yielding member to actuate said indicator, and a friction member adapted to yieldingly engage said plunger and which acts to permit indicating movements thereof and frictionally holds the same against return movements when the pressure thereagainst has been relieved.

12. In a hardness testing machine, the combination of a frame, a measuring element having a spring pressed test member supported opposite said frame, a work support movable towards and from said measuring element to press a sample against said test member, and means for moving said work support, said work support comprising a platen carrier slidable in a hole in said frame and a platen member having a work supporting face, said platen member being adjustable relatively to said carrier to position the test member engaging face of a sample against said test member before said work support is moved.

13. In a hardness testing machine, the combination of a frame, a measuring element having a spring pressed test member supported opposite said frame, a work support movable towards and from said measuring element to press a sample against said test member, and means for moving said work support, said work support comprising a platen carrier slidable in a hole in said frame and a platen member having a work supporting face formed on an end thereof, said platen member having a screw threaded portion engaging in a threaded hole in said platen carrier and adapted to be moved lengthwise thereof to position the test member engaging face of a sample against said test member, and a part on said platen member for turning the same in said platen carrier.

14. In a hardness testing machine, the combination of a frame, a measuring element having a spring pressed test member supported opposite said frame, a platen movable in and extending from said frame, means for moving said platen toward and from said measuring element to press a sample against said test member, said measuring element having a hollow shell, a spring arranged therein, a disk adapted to be secured in said shell for holding said spring in said shell and compressing the same to a predetermined capacity, a stationary yoke having a cavity therein, said shell, said spring and said disk being insertible and removable from said cavity as a unit without disturbing the setting of said spring, and a plunger for supporting said test member in operative relation to said spring.

15. In a hardness testing machine, the combination of a frame, a measuring element having a spring pressed test member supported opposite said frame, a platen movable in and extending from said frame, means for moving said platen toward and from said measuring element to press a sample against said test member, said measuring element having a hollow shell, a spring arranged therein, a disk adapted to be secured in said shell for holding said spring in said shell, said disk being adjustable lengthwise of said shell to adjust and compress said spring to a predetermined capacity, a stationary yoke having a cavity therein, said shell, said spring and said disk being insertable and removable from said cavity as a unit without disturbing the setting of said spring, and a plunger for supporting said test member in operative relation to said spring.

16. In a hardness testing machine, the combination of a frame, a measuring element having a spring pressed test member supported opposite said frame, a platen movable in and extending from said frame, means for moving said platen toward and from said measuring element to press a sample against said test member, said measuring element having a hollow shell, a coil spring arranged therein, means for securing said spring in said shell and holding the same in compression to a predetermined capacity, means for stationarily supporting said shell, a plunger for supporting said test member so as to compress said spring when engaged by a sample on said platen, and said coil spring being relatively long, whereby any error occurring by reason of the penetration of said test member into said sample may be reduced to a minimum.

DONALD C. DAVIS.